Figure 3:
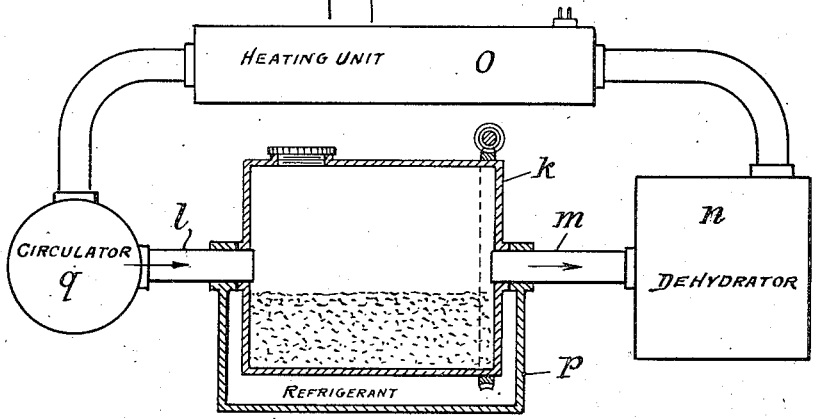

April 7, 1942.    P. RAUER    2,278,670
PROCESS OF PREPARING PROTEIN MATERIAL
Filed April 6, 1937    3 Sheets-Sheet 1
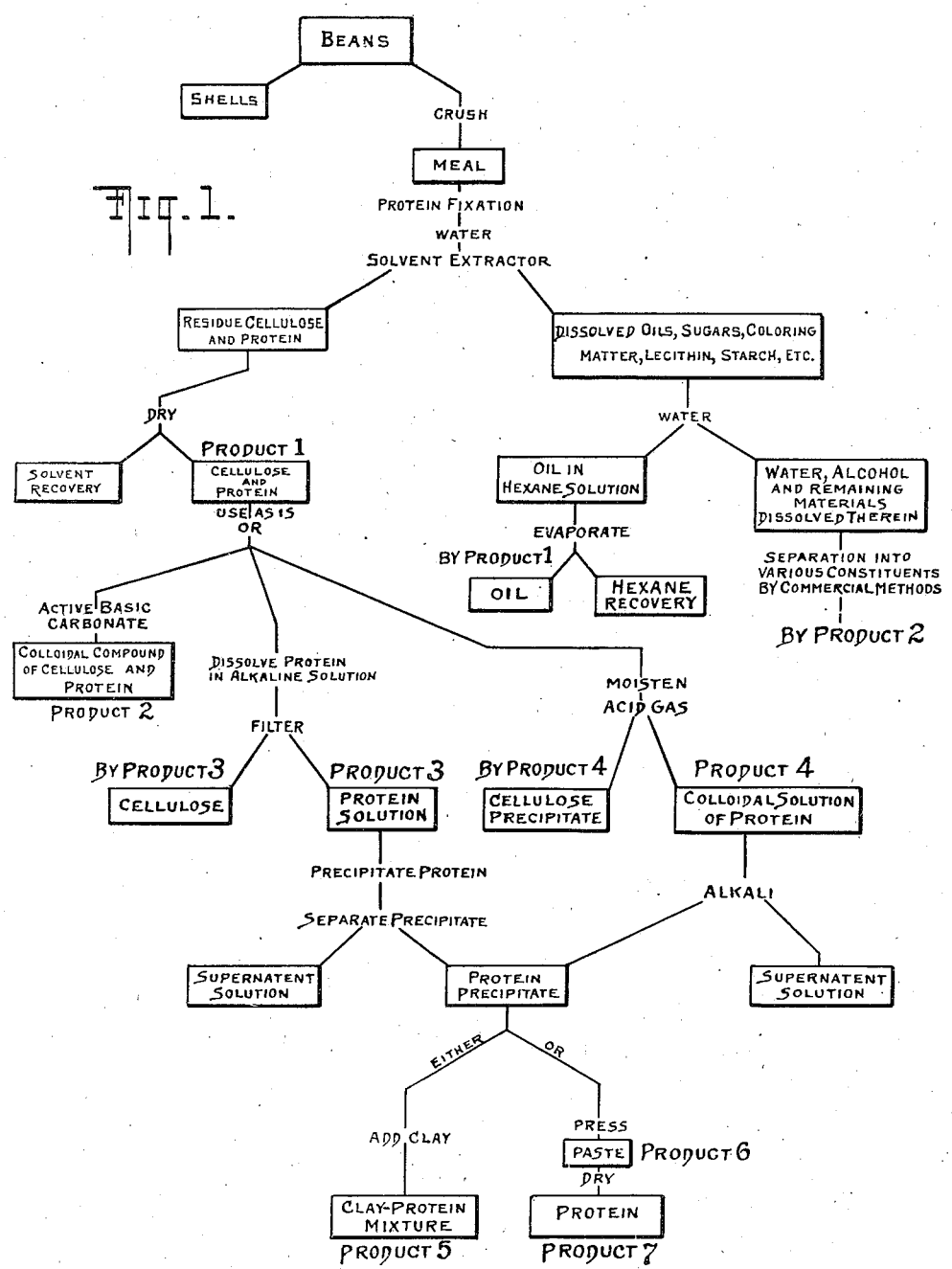

April 7, 1942.　　　　P. RAUER　　　　2,278,670
PROCESS OF PREPARING PROTEIN MATERIAL
Filed April 6, 1937　　　3 Sheets-Sheet 2

WITNESS
G. V. Rasmussen

INVENTOR
PHILIP RAUER
BY
ATTORNEYS

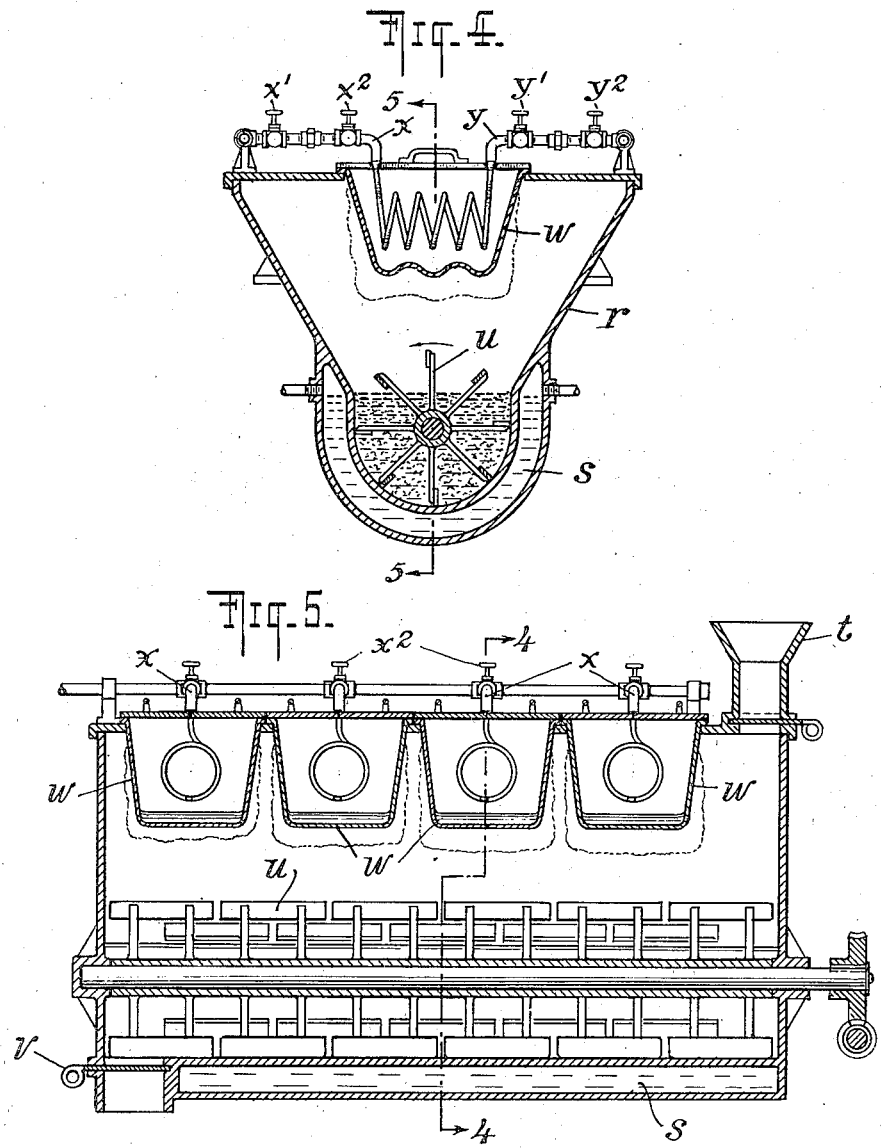

Patented Apr. 7, 1942

2,278,670

UNITED STATES PATENT OFFICE 2,278,670

PROCESS OF PREPARING PROTEIN MATERIAL

Philip Rauer, New York, N. Y.

Application April 6, 1937, Serial No. 135,231

3 Claims. (Cl. 260—112)

The invention relates to improved methods and processes of manufacturing protein material from vegetable or other substances containing protein and to the improved products which result from the adoption of such improved processes. More particularly the invention relates to the manufacture of vegetable proteins from substances such as soya beans. The process, however, is not intended to be limited to soya beans as a starting material, but is suitable to other protein or protein-containing vegetable or other materials such as plants or fruits or fish which may either contain oil or which may not contain oil, or fat.

The invention will be described in connection with the treatment of soya beans, although it is to be understood that a corersponding treatment of other suitable starting materials is not thereby intended to be excluded from the scope of the invention.

It has heretofore been proposed to effect separation of proteins from material such as soya beans by first removing the oil contained in the soya beans by either pressing ground soya beans or by extraction methods with a suitable solvent or a combination of these two processes. In any event, the initial step of the protein extraction procedure has generally begun with the soya bean meal from which the major portion of its oil has been previously removed. In order to recover the proteins from the residual pressed cake the procedure generally recommended in the past has been to cause dissolution in a suitable alkali of the whole of the alkali-soluble or partly soluble components of the oil-extracted meal including the proteins, followed by precipitation by means of acid.

It is apparent from the nature of this procedure that the precipitated proteins were necessarily accompanied by other substances. Attempts to separate such substances from their admixture with the proteins either while in the form of solution or after precipitation, have not been successful and it has accordingly been considered impossible to produce a plant protein product which will be consistently substantially pure undenatured protein free from other constituents of the soya bean material. Hence, it has not been possible by any known method to produce from material such as soya beans a product which will be at least completely as good and as available as milk casein in industries such as the paper-coating industry. In other words, plant or animal proteins thus far could not be compared favorably with milk casein.

In order to obtain a proper understanding of the nature of the present invention, it should be borne in mind that soya beans or similar raw materials are to be considered as highly complex organic compounds and that all of these compounds are more or less of such character that a quantitative separation is tedious and difficult on account of the slimy and colloidal character of the material which is developed during manufacture.

This condition is responsible for the difficulty thus far existing and not satisfactorily solved, of effecting a proper isolation of the proteins as distinguished from all the other components of soya bean meal.

According to my new process, I do not attempt to effect extraction from the soya bean meal of the whole of its alkali-soluble components followed by a separation as between the separate components, but I pursue the course of treating the soya bean meal first for the removal of every component except the cellulose and the proteins (preferably providing in that connection protection for the proteins against solvent- or protein-affecting action on the part of the other substances or agents which are present during the treatment) and then, having reduced the meal to this condition, making it available for commercial use in that condition or at this stage effecting for the first time a separation as between the cellulose and the proteins. I also, in one variation of the new process, convert protein material into colloidal form, a result which, so far as I am aware, has not hitherto been attained by anyone.

In practicing my process I preferably begin by using the soya beans themselves, removing the shells (this is not necessary) and then grinding the beans into a coarse powder or meal, the grinding being preferably effected in the dark. This ground meal, containing all the constituents of the beans, including the oil and olein, gums, sugars, lecithin, coloring matter, carbohydrates, cellulose, and proteins, forms the basis of the subsequent treatments.

It is possible to apply the subsequent treatments also to soya bean meal from which oil has previously been extracted or removed, but it is preferable and economically of advantage in the practice of my process to begin with the soya bean meal which contains the whole of the soya bean substance.

In the preferred method of procedure, I subject the raw material, that is the soya bean meal, to treatment whose object it is to bring the proteins contained in the meal to such a state that they are not subject to destruction or to removal by the subsequently applied methods used for the extraction of the constituents of the beans other than the proteins and cellulose. This result can be accomplished by exposing the proteins to an electric treatment. For example, the ground meal can be passed through an electric field. The result of the stated preliminary treatment is to fix the proteins and to make them less soluble.

The second stage of my process consists in removing from the soya bean meal everything except the proteins and the cellulose. There are several variants of the procedure and I will therefore first describe the preferred one.

Moisten the meal, allowing it to absorb as much water as it is capable of absorbing, but preferably not permitting an excess of the water, and then subject the moistened meal to solvent extraction, preferably in an extractor of the Soxhlet type, using for the solvent a mixture of hexane and methanol (methyl alcohol). The added materials may be so proportioned, for example, that in the mixture of solvents and wet meal there will be approximately 80% hexane, 10% methanol, and 10% water. The result of this extraction treatment is to remove from the meal whatever oil (including oleins) it may have contained, to extract the sugars, coloring matters, lecithin, starch, and other components, leaving behind substantially only the cellulose and the proteins associated therewith.

Other solvents or mixtures of solvents than the particular solvents mentioned may, of course, also be used, but I believe that the solvents named will be the most satisfactory.

It is also possible to use the solvents alternately, but this is not the preferred practice. An extraction with hexane followed by one with an acid mixture proved to be very effective in removal of carbohydrates.

In passing the solvents through the Soxhlet apparatus, the solvents will at first extract certain ingredients from the meal and on subsequent recirculation of the solvent containing such extracted material, there is a constantly changing condition, the several complex organic compounds probably changing and producing new mixtures which have different solvent actions. The temperature of the meal in the apparatus should be kept at about 35° C. and should not be allowed to exceed 37° C. When the accumulation of liquid below the syphon is colorless this is an indication that the extraction treatment has been completed.

At the end of the extraction process the solvent with its dissolved contents is treated for the recovery of oil which can be readily accomplished by adding water, permitting the liquid to stand and to separate into layers, the top layer then containing in hexane solution substantially all of the oil which was initially contained in the beans, while below that layer will appear a section which contains the water, alcohol, and all parts which have gone into solution in alcohol and water. The crude oil which is recoverable from the upper layer by evaporation of the solvent (with solvent recovery) is an oil of finer grade and of greater commercial value than soya bean oil which is obtained by pressing oil from the beans or by other methods.

The solid residue of the extraction process, i e., the cellulose with associated proteins, is now dried, preferably in vacuum, with solvent recovery, and is constituted of about 80%–85% proteins and 15%–20% cellulose. The material can be bleached if desired and ground, and in its ground condition the product can be directly used in the paper mill. It is not even necessary to grind the material if the industrial user is prepared or accustomed to filter his solution. The material in this stage, characterized by its high content of substantially pure proteins accompanied by a minor percentage of substantially pure cellulose, is believed to be a new product not heretofore produced by others or made available for use in this art.

Cellulose, when exposed to the effects of alkali, tends to discolor and in order to counteract this tendency I have adopted a colloidal method which involves adding material such as an active basic carbonate such as active magnesium carbonate. The addition of about 3% of carbonate to the cellulose-protein material in dry form has the effect of producing colloidal proteins and one in which the cellulose does not discolor. In case it is desired to obtain a product which shall be practically free from cellulose, I take the cellulose-protein material and dissolve the proteins in an alkaline solution, whereupon the undissolved cellulose can be separated by filtration. To the solution which remains acid is added, for example, a mixture of about two-thirds hydrochloric acid and one-third calcium chloride together with small quantities of calcium or sodium lactate and/or butyric acid. In the conduct of this process step, I prefer to spin the alkaline solution into the acid solution. The lactate and/or butyric acid seems to act as a buffer to prevent the hydrochloric acid from making too strong an acid attack upon the proteins. Lactate, together with the butyric acid, when used, or the lactate alone, or the butyric acid alone, causes a characteristic odor of lactic acid to be imparted to the precipitated proteins. The lactate as well as the butyric acid also apparently cause an increase in the adhesive characteristics of the product. The slight lactic odor is not objectionable, but in fact causes the product to more closely resemble milk casein even down to so minor a matter as odor.

At the end of the precipitation treatment the liquid is drawn off and the precipitate pressed out to a condition where it consists of approximately 50% protein and 50% water and preferably less than 50% water, a condition which can be brought about by subjecting the material to high speed centrifugal action and/or filter-pressing the water out in a hydraulic press. It is, however, highly desirable that the product should be quite dry and the removal of the small percentage of water which cannot be eliminated by centrifuging or filter-pressing, presents problems. The method which I have developed and which I prefer to use for drying consists in converting the precipitate into the form of little worms as by pressing the precipitate through a small orifice and then freezing the worm-shaped precipitate and passing cold dry air over the frozen material. The temperature of the air, which is passed over the frozen material, is slightly above the freezing point of the frozen precipitate. For example, the temperature of the frozen precipitate may be approximately −4° C. and the temperature of the dry air +2° C. Under these conditions the dry air will carry off the water without affecting the proteins, while the proteins, during the drying treatment, are preserved from deterioration by being in a refrigerated condition. The freezing points of the several proteins differ but there is a sufficient difference between the range of freezing points of the proteins and the freezing point of water, that the water can be separated by evaporation. Since cold dry air retains less water than warm dry air, the velocity of the air is increased and at a differential temperature of 6° C. is capable of removing about 4 gr. of water per cubic foot of air. The velocity of the air is therefore controlled to obtain most efficient results. The air which has passed over the frozen mixture and has picked up water from the water component of that mixture is passed into a cold chamber where the water is frozen out. A simple circulating system to bring the temperature of the dried air back to +2° C. can therefore be readily installed and also serve incidentally to limit the amount of oxygen which is allowed to pass over the frozen proteins during the drying procedure. As a result of this drying procedure, the proteins become quite dry and can be removed as a fluffy product. The freezing process seems to develop the phenomenon that the protein particles apparently explode as water is removed and thus become infinitely fine, exposing greatly increased surface area. The product obtained by the foregoing treatments is of a novel character and is identifiable primarily by the fact that it is a powdered protein mixture of vegetable origin so closely resembling milk casein as to be distinguishable therefrom only by careful tests. It is a product which has not been subjected to denaturing influences. It contains no starch. Its viscosity, tested according to the Stormer method, is practically the same as that of milk casein. For example, the viscosity of milk casein is 15, while the viscosity of my product is in the neighborhood of 14. The total acidity of the product is slightly less than that of milk casein. The free acid stated in cubic centimeters is 1.4 as contrasted with 1.7 for milk casein. The ash content is 2.1 as compared with milk casein's 2.5. In the quality of adhesiveness the figure for the new product also closely approaches that of milk casein's 11. The stated figures are, of course, somewhat variable, according to the care with which tests are applied, but they represent a reasonably accurate average.

Having now described the procedure as conducted in the preferred method of practicing my invention, I find that I can modify and vary the procedure in numerous particulars. For example, in order to prevent denaturing of the proteins and to enable me to follow the basic principle of my procedure, that is to remove from the bean meal everything except the cellulose and the proteins instead of attempting to bring the proteins into a solution together with other substances and then endeavoring to separate out only the proteins, I may proceed as follows:

Starting with the soya bean meal, enough water is added to form a paste, after which the meal is saturated with water at a temperature of about 45° C. The wet meal is then let stand for a period of time, over night, for example, at a lower temperature. The material will then give an alkaline reaction. If the mass is now heated up to about 35° C. and a little water added, it will show a slightly acid reaction. Caustic soda is then added in any sufficient amount to saponify the free fatty acids plus a surplus of perhaps 50%. In this particular, the procedure in this case, unless it is previously known that successive batches of soya beans came from a uniform source, is to preliminarily analyze the batches for a determination of the percentage of oil content and the presence of the olein content in the oil. For example, there may be an oil percentage of 10–12% and an olein percentage of 3–6%. In that event the amount of caustic soda to be added will depend upon the amount of the olefin previously determined to be present and that caustic soda is not an agent intended to affect the proteins but merely to saponify the free fatty acids. A mixture of hexane and methanol is now added and the mass well stirred, the solvent removing from the meal substantially everything except cellulose and the proteins and the solvent mixture separating into layers of which the upper layer consists practically of oil dissolved in hexane with the oil stripped of its olein while below this upper layer will be found the saponified fatty acid or soap layer and below that the layer in which are contained all of the other substances which have been abstracted from the bean meal. After these liquid layers are removed, the remaining material is washed with cold water and filtered and the point is arrived at where the cellulose and proteins are practically the only two substances which remain and they can be dealt with exactly as heretofore described.

Another modification of the procedure consists in starting with the bean meal, adding water, and allowing thorough saturation to proceed by permitting the mass to remain standing over night at a low temperature. There is then added an amount of alkali sufficient to take all the proteins in solution. When this is done the next step is to precipitate with acid. In this case the acid precipitation is employed not for the purpose of separating the proteins, but in order to fix them and make them resistant to the solvent action of hexane and methanol which then follows. In conducting the precipitation procedure in this last instance, a sufficient amount of diluted acid may be added to take sugars into solution but not the proteins. Thereupon, the material is filtered and washed, hexane and methanol added to the residue, the oil and other substances removed, the residue washed, and filtered. Here again the same point is reached where the solid which remains is constituted practically of nothing but proteins and cellulose.

When the proteins are to be separated from the cellulose, the method previously described can be followed, but I have also found it possible to pursue a course which will result in the production of the proteins in colloidal form. This I accomplish by moistening the residue of proteins and cellulose and using an acid gas such as ethylene oxide in the presence of a carbonate, for instance magnesium carbonate. The cellulose is thereupon precipitated from the colloidal solution and removed, whereupon the colloidal proteins are in turn precipitated from the remaining solution by the use of alkali or an equivalent agent. At the end of the precipitation treatment the precipitate is separated from the supernatant liquid and then dried in the manner hereinbefore described, or the material can be used in the liquid state for industrial purposes.

In the drying procedure, instead of freezing the little worms or sausages formed by pressing the precipitate through a small orifice and then passing cold dry air over such frozen worms, I may as an alternate drying procedure deposit the moist worms in a closed chamber provided at its lower part with a tray and at its upper part with a container or plate associated with a refrigerating medium. The lower part of the chamber would be arranged to be kept at a temperature for instance of plus 10° C. so that the moist protein precipitate in sausage form deposited therein is kept at that temperature. After a charge of the sausage-shaped precipitate is placed in the chamber the air therein can be displaced by an inert gas or a gas capable of preventing spoilage of the material and the chamber completely closed. Under these conditions, the gas will take up moisture from the proteins and deposit it on the refrigerated plate in the form of ice and as the circulating gas will constantly take up additional amounts of moisture from the proteins, the proteins will become quite dry in a short time.

Another modification in the drying procedure consists in placing the moist protein precipitate in worm-like form into a vessel which at its outlet side is filled with glass wool or the like to permit the passage therethrough of fluid, but to retain the wormy material within the vessel. Acetone is now flowed through the vessel and passes through the interstices of the worm-like material with the effect of eliminating moisture and of rigidifying or stiffening the entire mass of the material under treatment so that this material, instead of matting up or collapsing into a non-permeable state, retains its sponge-like or porous form. From time to time the effluent from the vessel is tested for water and when no further water appears in the acetone, the flow of acetone is discontinued. The container with the material still within the same or the material after being removed from the container is placed in a still and the adhering acetone evaporated away. At the end of this step the proteins are in a brittle, stable, thoroughly dry condition, in which state they readily crumble and can easily be reduced to powder.

Still another modification of the drying procedure is to take the moist protein precipitate and mix it with clay, for example, China clay, in which case the moisture in the proteins will be drawn by the clay into itself. The amount of clay used should be approximately equal to the amount of proteins by weight in the moist precipitate or in other words, approximately half the weight of the precipitator when it consists of 50% proteins and 50% water. This product is useful for commercial purposes such as in the coating of paper, etc., and should preferably contain a preservative to keep the proteins from spoiling.

Another particular in which the method of practicing my invention may be varied is in the precipitation of the proteins from solution after the desired removal of other materials has been accomplished. Instead of proceeding as above described, I may expose the solution of proteins to a treatment with high frequency current, for example, 15,000 volts and ½ to 1 milliamperes per hour per 500 cc. This treatment if continued for a sufficient time, causes a satisfactory precipitation of the proteins. If desired, a small amount of acid, such as hydrochloric acid, may be added to the solution just prior to the electrical treatment and thoroughly mixed with the solution. The function of the hydrochloric acid of which about 1% by volume or something like 8-15 cc. concentrated HCl per thousand grams is added, is apparently partially to neutralize any alkaline condition which may be present in the solution and partially to insure the porosity requisite in the precipitate for any subsequent washing and/or squeezing out of water.

Figure 2:
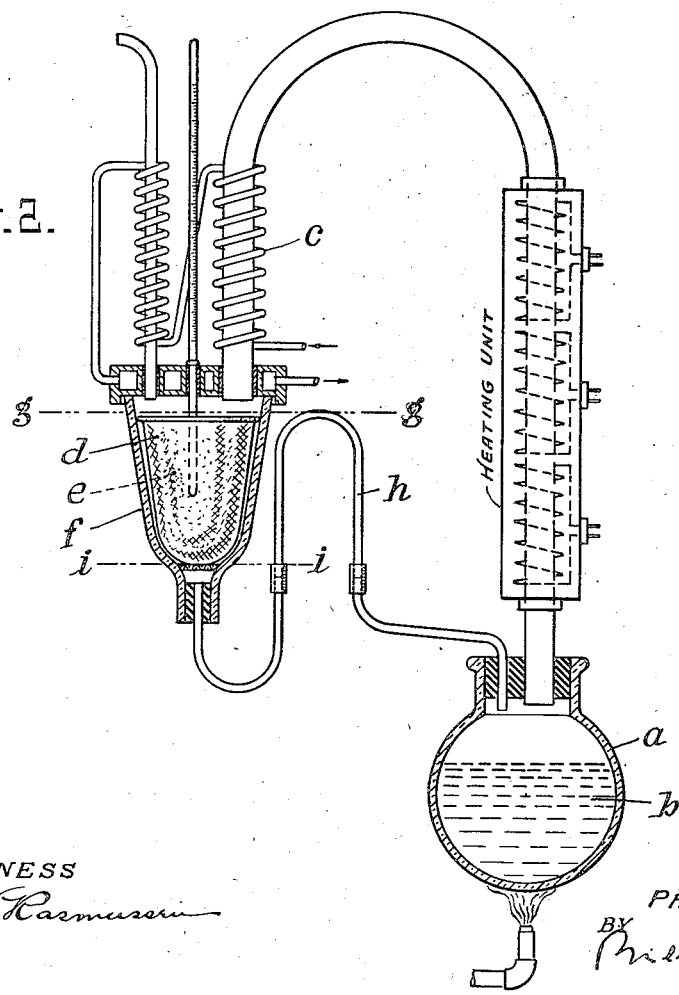

In an effort to illustrate the procedure employed by me, I have shown in the accompanying drawings, Fig. 1, a schematic showing of the sequence of steps; in Fig. 2, a representation in section of a conventional set-up of the Soxhlet apparatus; in Fig. 3, a section of one form of drying chamber; in Fig. 4, a transverse section of another form of drying apparatus and in Fig. 5, a longitudinal section of the apparatus shown in Fig. 4.

In these drawings, Fig. 1 is provided with descriptive words indicative of the steps of the procedure and the products and by-products. In Fig. 2, the container $a$ holds the solvent $b$ which is evaporated by the application of heat to the container $a$. The vapors from the solvent rise into the vertically extending tube which is provided with an adjustable heating unit to maintain them in vapor form during their passage through such portion of the tube, and then pass downwardly through the portion of the tube which is surrounded by the cooler unit or condenser $c$ where they are condensed, the condensate trickling down into the container $d$ which is filled with the soya bean meal $e$. The solvent and what is extracted from the meal pass out through the walls of the container $d$ and accumulate in the chamber $f$, the height of the liquid in the container $d$ and chamber $f$ rising as the condensate continues to come over. When the liquid in the chamber $f$ rises to the height of the line $g$—$g$, the syphon $h$ will begin to function and empty the chamber $f$ down to line $i$—$i$, the liquid in the container $d$ draining out through the walls thereof. The procedure repeats itself and when the liquid accumulating in the chamber $f$ below line $i$—$i$ appears clear the extraction is ended.

In Fig. 3, rotating drum $k$ contains the frozen protein and water, the temperature of which is maintained at say $-4°$ C. by refrigerant maintained in the vessel $p$. Air or inert gas at a temperature of $+2°$ C. is admitted at $l$ and leaves at $m$, entering the chamber $n$ wherein water carried off by the air from the worm-like proteins is frozen out. The air then, on leaving the freezing chamber $n$, passes into the apparatus $o$ wherein its temperature is again brought up to $+2°$ C. and from which the air or gas is recirculated by a fan or blower $q$ to inlet $l$ of drum $k$.

In Figs. 4 and 5, the lower part of casing $r$ contains the worm-like protein precipitate, the temperature of which is maintained at plus 10° C. by passing a suitable medium having the desired temperature for the purposes of the process through the chamber $s$. The wormy protein precipitate is charged into the casing $r$ through the inlet $t$ and is removed at the end of the treatment through the opening closed by the sliding door $v$. While the precipitate is in the casing, it is constantly stirred up by the rotating paddle wheel $u$. The upper part of the chamber is provided with a refrigerating unit or units $w$ which are maintained at freezing temperatures by a refrigerant entering the unit at $x$ from a source of supply and leaving the units $w$ at $y$ to be returned to its cooling source and then recirculated. With this arrangement, the moisture in the precipitate will be drawn out gradually into the gas contained in the chamber and collect in the form of ice on the refrigerated units $w$. The ice which forms on the units $w$ may be removed by subjecting the inner surfaces of the units to a suitable source of heat, such as hot water or radiated heat, the ice dropping off in a single piece after the wall of a unit has been sufficiently heated. As is indicated, the lower walls of the units $w$ are corrugated to provide a greater contacting surface for the moisture-laden gas and to permit of easy removal of the ice. As is indicated, the units may be removed one at a time, the valves $x^1$, $x^2$, $y^1$ and $y^2$ being provided with each unit to permit separation of the same from the supply and discharge pipes without loss of the refrigerant.

While I have shown and described several forms of apparatus by which the process steps of my invention may be carried out, it will be understood that these forms are shown for the purposes of illustration and that the actual apparatus which will be used in the commercial production of my products, while it will embody the same principles of the illustrated forms, may be substantially different in arrangement and construction. In connection with the use of the apparatus illustrated in Fig. 2, I have also found that very effective results may be obtained by the use of acidulated water. The acidulated water may be used alone under certain conditions of the meal, or it may be used with the hexane or with the methanol or with a mixture of hexane and methanol. It is also possible in the carrying out of the extraction treatment to use the acidulated water alternately with the hexane and/or methanol.

In conducting the separation treatment for the abstraction of the proteins from the cellulose-protein material remaining from the extraction treatment, I prefer to mix with the alkaline solution of proteins a material which will induce a coagulation of the proteins so that the latter separate out from the solution in the form of coagulated masses. This may be accomplished by the addition of calcium or sodium lactate and/or butyric acid, as hereinbefore described or some other suitable coagulant may be used. In the method described, the solution is prepared for the coagulating step so that when the acid solution is added, the coagulation occurs. It is also possible to cause a condition in the solution which will induce a coagulation of the proteins without the use of the acid solution. For example, a coagulation of the proteins in solution may be induced by an electric current alone or in combination with chemical reagents. This may be accomplished by connecting the solution with one terminal of a transformer capable of producing a 15,000 volt current and connecting the other terminal of the transformer with a tube filled with one of several suitable gases. After several hours' exposure of the solution to such electric field, coagulation takes place. As a result of the coagulating step of my process, the proteins are adhesively drawn together from the solution and come down in the form of clumps or clots instead of segregated particles as in the usual methods of precipitation. The clots are spongy masses of proteins having somewhat the appearance of lumps of pulp but the particles of which are possessed of a greater cohesiveness. The clumps of protein are not sticky to the touch and may be separated into small stringy-like forms by rubbing between the fingers. The advantage of precipitating the proteins in this form is that I find that they are more completely removed from the solution than when precipitated as segregated particles. Due also to the spongy, non-adhesive clot-like form of the coagulated masses, less difficulties are encountered in the removal of the excess moisture and the proteins are dried more readily. A preservative to keep the proteins from spoiling may also be added at this step of the process by using as the coagulant materials which in addition to being capable of inducing a coagulation of the proteins are also capable of exercising a preserving action on the proteins, such as, for example, formaldehyde or formaldehyde salts.

I claim:

1. In a process of preparing a protein concentrate from soya beans, the steps which comprise comminuting the soya beans and subsequently subjecting the same to the action of a mixture of a major proportion of hexane and minor proportions of methyl alcohol and water, for extracting the oils, gums and carbohydrates, and other non-protein substances contained therein, and separating the protein-cellulose residue from the extraction liquor.

2. In a process of preparing a protein concentrate from soya beans, the steps which comprise comminuting the soya beans and subsequently subjecting the same to the action of a mixture of approximately 80% hexane, 10% methanol, and 10% water, for extracting the oils, gums and carbohydrates, and other non-protein substances contained therein, and separating the protein-cellulose residue from the extraction liquor.

3. Process for the separation of proteins from soya beans, comprising comminuting the soya beans, thereafter subjecting the same to extraction with a mixture of a major proportion of a liquid aliphatic hydrocarbon solvent, and a minor proportion of a liquid, water-miscible, aliphatic alcohol and water, to remove the oils, gums, sugars, and other non-protein substances contained in the beans, separating the protein-cellulose residue, dissolving out the protein material with the aid of dilute aqueous alkali, and then precipitating the proteins with an acid precipitating agent containing butyric acid.

PHILIP RAUER.